(12) United States Patent
Solomon

(10) Patent No.: US 7,645,432 B1
(45) Date of Patent: Jan. 12, 2010

(54) EXHAUST TREATMENT SYSTEM AND METHOD

(75) Inventor: Jason David Solomon, Troy, OH (US)

(73) Assignee: Hood & Motor Technology, LLC, Phoenix, AZ (US)

( * ) Notice: Subject to any disclaimer, the term of this patent is extended or adjusted under 35 U.S.C. 154(b) by 449 days.

(21) Appl. No.: 11/588,826

(22) Filed: Oct. 27, 2006
(Under 37 CFR 1.47)

Related U.S. Application Data

(60) Provisional application No. 60/777,612, filed on Feb. 28, 2006.

(51) Int. Cl.
*B01D 53/56* (2006.01)
*B01D 53/62* (2006.01)
*B01D 53/74* (2006.01)
*B01D 53/92* (2006.01)
*F01N 3/08* (2006.01)

(52) U.S. Cl. ............ 423/212; 423/215.5; 423/220; 423/235; 60/274; 60/304; 60/309; 60/310; 60/317; 60/324

(58) Field of Classification Search ............ 423/212, 423/215.5, 220, 235; 60/274, 304, 309, 310, 60/317, 324
See application file for complete search history.

(56) References Cited

U.S. PATENT DOCUMENTS

| | | | |
|---|---|---|---|
| 2,506,810 A * | 5/1950 | Ospina-Racines ............ 123/1 R |
| 2,717,049 A * | 9/1955 | Langford ..................... 96/377 |
| 3,836,338 A * | 9/1974 | Arnold ........................ 422/170 |
| 3,853,484 A * | 12/1974 | Sudar et al. .................. 422/113 |
| 4,416,855 A | 11/1983 | Abrams et al. |
| 5,123,836 A | 6/1992 | Yoneda et al. |
| 5,169,293 A | 12/1992 | Yamamoto |
| 5,231,937 A | 8/1993 | Kobayashi et al. |
| RE35,251 E | 5/1996 | Van den Broek |
| 5,570,644 A | 11/1996 | Cheng |
| 5,658,361 A | 8/1997 | Arencibia, Jr. |
| 6,199,491 B1 | 3/2001 | Wu |
| 6,383,462 B1 * | 5/2002 | Lang ........................... 423/235 |
| 6,425,531 B1 | 7/2002 | Nielsen |
| 2006/0277901 A1 * | 12/2006 | Allegre et al. ................. 60/317 |

(Continued)

OTHER PUBLICATIONS

Brain, Marshall, How Radial Engines Work, pp. 1-5, Feb. 14, 2006, http://travel.howstuffworks.com/radial-engine.htm/printable.

(Continued)

*Primary Examiner*—Timothy C Vanoy
(74) *Attorney, Agent, or Firm*—Taft Stettinius & Hollister LLP

(57) ABSTRACT

An exhaust treatment system and method for removing particulates and/or gases from exhaust gases and for cooling exhaust gases. The exhaust treatment system may include a venturi nozzle for injecting a mixture of water and air into the exhaust gases to cause particulate matter and/or certain gases present in the exhaust gases to adhere to water droplets in the mixture. The exhaust treatment system may further include a receptacle positioned in proximity to the exhaust outlet and adapted for collecting water and particulate matter exiting the exhaust outlet, a filter adapted to receive water from the receptacle and remove particulate matter from the water, and/or a heat transfer device adapted to receive water from the filter and remove heat from the water.

14 Claims, 4 Drawing Sheets

U.S. PATENT DOCUMENTS

2008/0110164 A1* 5/2008 Angoshtari et al. ........... 60/324
2008/0282688 A1* 11/2008 Bradley et al. ................ 60/311

OTHER PUBLICATIONS

Daniel, John, Steam Locomotive Basics—section 5, valves and pistons, pp. 1-2, The Great Western Archive, Copyright 2000, last modified Jan. 23, 2005, http://greatwestern.org.uk/basic5.htm.

Unknown, Viper Firefighting Nozzle Operational Trial: Interim Report May 15, 1997, Dept. of Navy, Washington, D.C., USA.

Unknown, S-series, Refractory Walled Air Burner Curtains, 2 pages, © 2003 AirBurners LLC, www.airburners.com, Palm City, Florida, USA.

Unknown, 15.5.10 Industrial Nelson Cell, p. 1of 1, www.uq.edu.au/ School Science Lessons, dated Sep. 9, 2005.

Office action issued by USPTO on May 13, 2009 for U.S. Appl. No. 11/588,825.

Unknown, Overview Air Curtain Destructors, 2 pgs., Jul. 2004, Air Burners LLC, Palm City, Florida, USA.

* cited by examiner

7,645,432 B1

EXHAUST TREATMENT SYSTEM AND METHOD

CROSS REFERENCE TO RELATED APPLICATION

This application claims the benefit of U.S. Provisional Patent Application Ser. No. 60/777,612 filed on Feb. 28, 2006, the disclosure of which is incorporated herein by reference.

BACKGROUND

The present invention relates to exhaust treatment. More particularly, a system and method for removing particulate matter and certain gases from exhaust generated by combustion or other industrial processes, is described.

SUMMARY

In a first aspect, the present invention exhaust treatment system may include an exhaust duct adapted to receive exhaust gases from a source; an exhaust outlet joined to the exhaust duct in fluid communication with the exhaust duct, adapted to flow exhaust gases out from the exhaust duct and adapted to flow water and particulate matter out from the exhaust duct; and at least one venturi nozzle joined to the exhaust duct. The venturi nozzle may have a channel including a section of narrower width than the surrounding sections, an air inlet through which air can enter the channel, and an internal baffle in the channel around which water flowing through the channel can pass such that water entering the venturi nozzle is mixed with air and the mixture is injected into the exhaust duct where the mixture causes particulate matter suspended in the exhaust gases to adhere to water droplets in the mixture. The mixture may cause carbon dioxide and/or oxides of nitrogen present in the exhaust gases to adhere to water droplets in the mixture. The exhaust treatment system may further include a receptacle positioned in proximity to the exhaust outlet and adapted for collecting water and particulate matter exiting the exhaust outlet, a filter adapted to receive water from the receptacle and remove particulate matter from the water, and/or a heat transfer device adapted to receive water from the filter and remove heat from the water.

In a second aspect, the present invention method for exhaust treatment may include the steps of receiving exhaust gases, mixing a spray of water droplets with the exhaust gases by a venturi nozzle and collecting the water droplets. The venturi nozzle may include a channel having a section of narrower width than the surrounding sections; an air inlet through which air can enter the channel; and an internal baffle in the channel around which water flowing through the channel can pass such that particulate matter in the exhaust gases will adhere to the water droplets. Carbon dioxide and/or oxides of nitrogen present in the exhaust gases may adhere to water droplets in the mixture. The method for exhaust treatment may further include a step of filtering the collected water, cooling the collected water, and/or recirculating the cooled water by mixing the water as a spray of water droplets with the exhaust gases.

DETAILED DESCRIPTION

Figure 1:
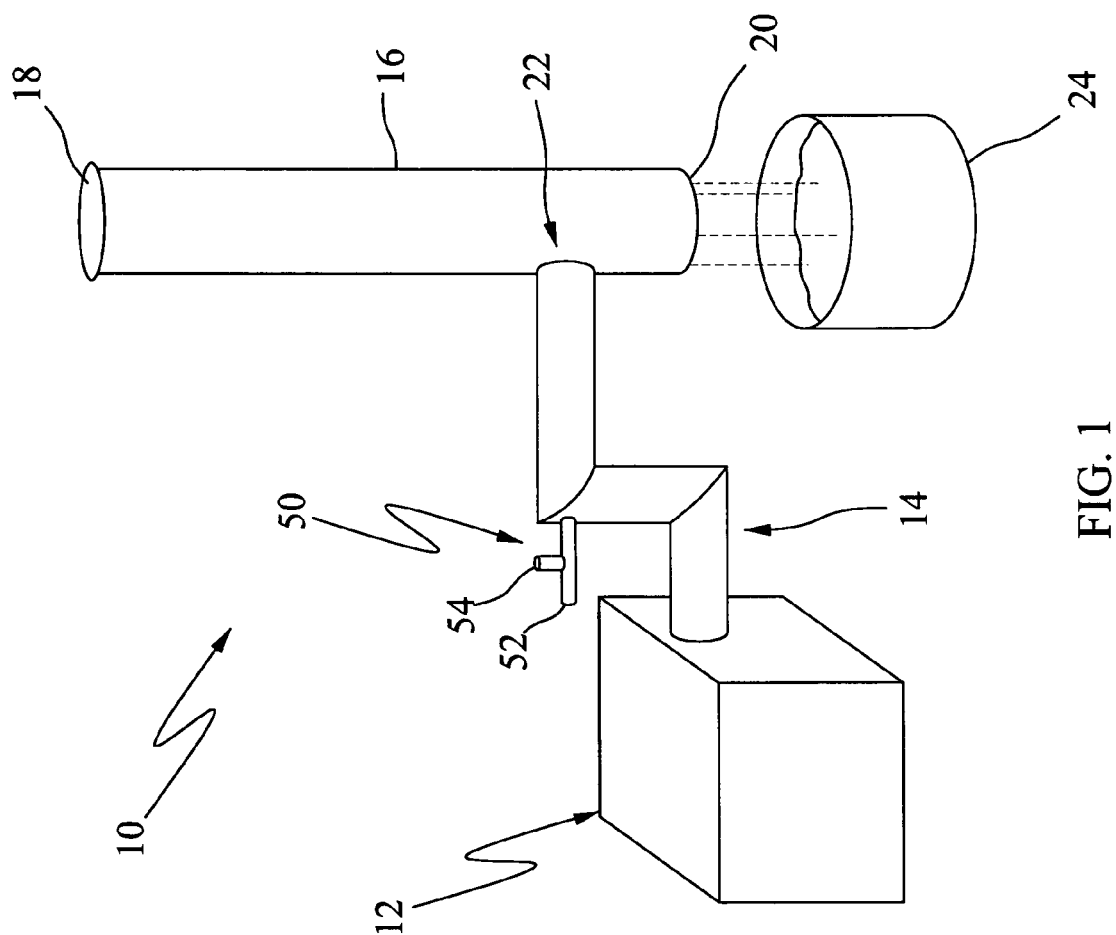
FIG. 1 shows a diagram of an exhaust treatment system 10, according to an exemplary embodiment of the present invention.

FIG. 1 shows a schematic diagram of an exhaust treatment system 10 according to an exemplary embodiment of the present invention. Exhaust is produced by a source 12 and conveyed away by a duct 14 and a smokestack or exhaust outlet 16, where the exhaust gases are emitted through opening 18. The exhaust source 12 can be any source of exhaust gases containing particulate matter including, without limitation, industrial furnaces or boilers fired with coal, oil, or any other fuel; municipal solid waste incinerators; and glass crushing facilities, where small airborne glass particulates are trapped and removed from the air. For applications involving gases from combustion, the composition of the exhaust gases and particulate matter contained therein will depend on several variables, including the type of fuel burned, the combustion parameters (temperature, pressure, etc.), furnace volume, and airflow. Additionally, as discussed below, the system and method of the present invention can be used with any source of exhaust gases, regardless of the presence of particulate matter therein, to lower the temperature of the exhaust gases being released into the atmosphere.

As depicted in FIG. 1, the exhaust duct 14 and exhaust outlet 16 can be configured in such a way that an air/water mixture can be sprayed into the exhaust stream to remove particulate matter from the exhaust gases. The exhaust duct 14 can have one or more openings through which water can be sprayed using a venturi nozzle 50. The venturi nozzle 50, which is described in more detail below, receives water through input port 52 and mixes it with air drawn in through air port 54. The water and air are mixed to form a finely dispersed water/air mixture, which is sprayed into the exhaust duct 14 in a direction toward the exhaust outlet 16, as shown in FIG. 1. As this finely dispersed water/air mixture is sprayed into the exhaust duct 14, fine particulates in the exhaust gases adhere to the water droplets. The exhaust outlet 16 can be adapted to have a lower opening 20 through which the water can pass as it falls downward from the junction point 22 where the exhaust duct 14 joins the exhaust outlet 16. Meanwhile, the exhaust gases rise and are released through the opening 18 above the junction point 22. The water, which now contains fine particulates that were trapped from the exhaust, can be collected in a receptacle 24 to be processed, filtered, or discarded.

Figure 2:
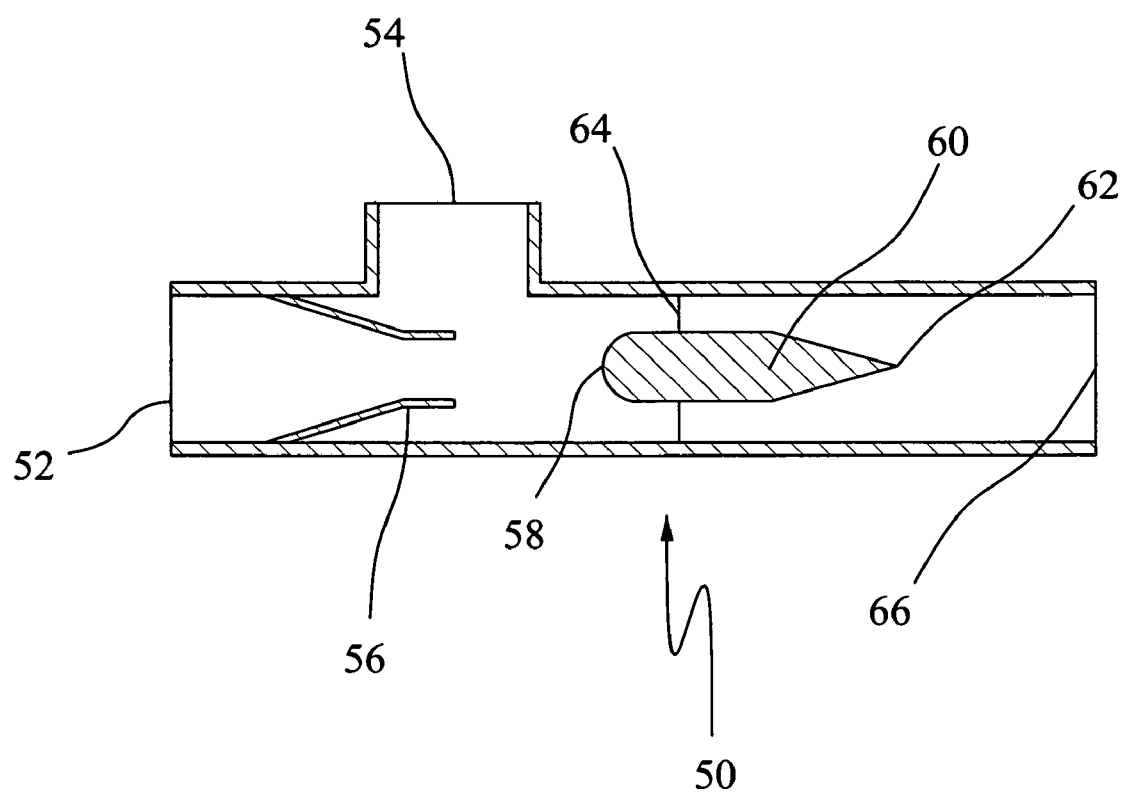
FIG. 2 is a cross-sectional view of the venturi nozzle, according to an exemplary embodiment of the present invention.

FIG. 2 shows a side cutaway view of the venturi nozzle 50, according to an exemplary embodiment of the present invention. Water is supplied to the venturi nozzle 50 through inlet 52, and the water flow velocity is increased as the water passes through the channel 56. The narrowed stream of water emerging from the channel 56 strikes the butt end 58 of the baffle 60, which is held in place by radial stays 64. Upon striking the butt end 58, the water is dispersed into the annular region surrounding the baffle 60. The dispersion of the water creates a partial vacuum in the region between the channel 56 and the baffle 60 and air is drawn in through port 54. The water and air pass around the baffle 60 through the annular region and over the pointed end 62 of the baffle 60. The turbulence resulting from the pass around the baffle 60 mixes the air with the water. The aerated water then exits the venturi nozzle 50 through opening 66. In an exemplary embodiment, the overall diameter of the nozzle body is 40 mm (1.6 inches), the pointed end 62 of the baffle 60 is tapered with an angle of 30 degrees, the baffle 60 has an overall length of 76 mm (3 inches) with the tapered portion being 25 mm (1 inch) long, the butt end 58 of the baffle 60 is located 18 mm (0.7 inches) away from the end of the channel 56 from which water emerges, and the channel 56 and baffle 60 each have a diameter of 19 mm (0.75 inches). In an alternative embodiment, the overall diameter of the nozzle body is 51 mm (2.0 inches), the channel 56 and baffle 60 each have a diameter of 25 mm (1.0 inch), and the other measurements have the same values as in the first embodiment described above. In additional embodiments, other values for these parameters could be used to achieve the desired performance and mixing characteristics, as will be appreciated by persons skilled in the art.

Figure 3:
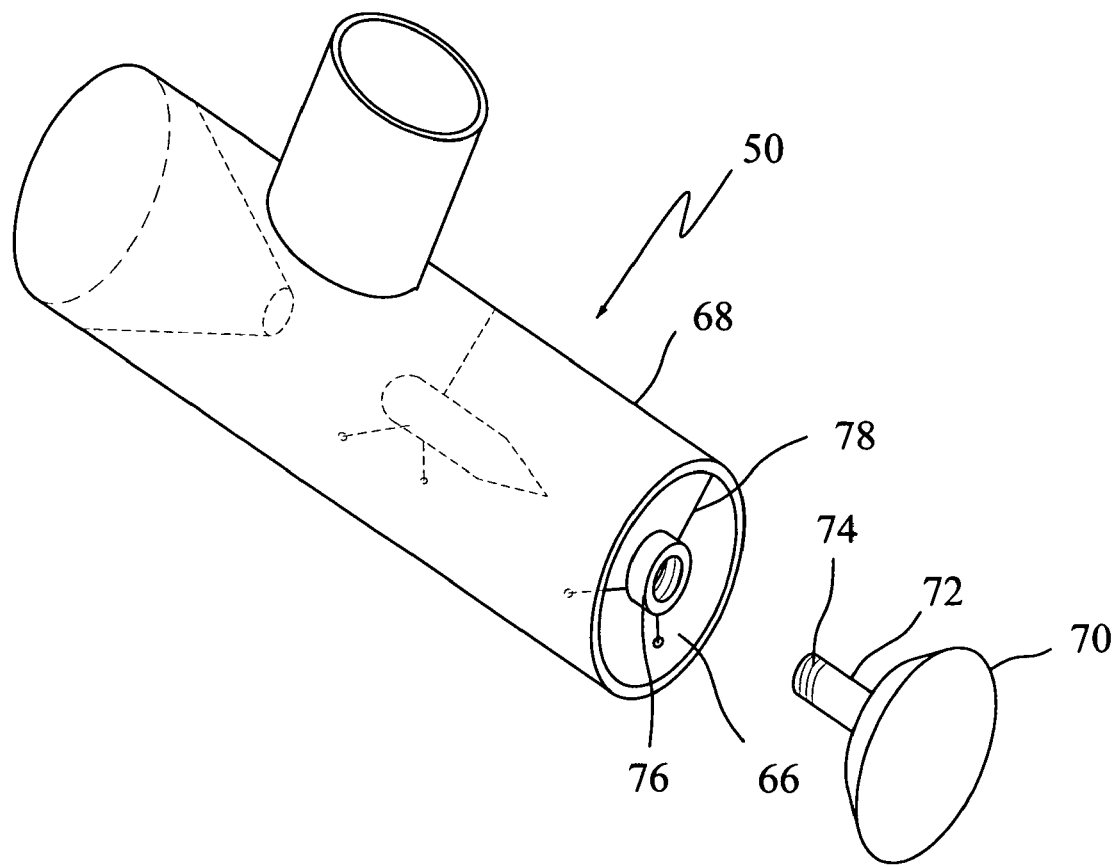
FIG. 3 is an exploded perspective view of the venturi nozzle, according to an exemplary embodiment of the present invention.

FIG. 3 shows the venturi nozzle 50 equipped with a sprayer 70 to finely disperse the water/air mixture that exits the venturi nozzle, according to an exemplary embodiment of the present invention. The sprayer 70 includes a tapered disc having a maximum diameter that is approximately equal to the diameter of the exit orifice 66 of the nozzle body 68. The disc of the sprayer 70 has a bolt 72 with a threaded end 74. This threaded end 74 can be threaded into a hub 76 that is held in place along the longitudinal centerline of the nozzle body 68 by radial stays 78. As water/air mixture exits the venturi nozzle 50 through the exit orifice 66, it is deflected by the sprayer 70, producing a relatively fine mist.

In addition to trapping and removing particulate matter from exhaust gases, the system and method described herein have the effect of lowering the temperature of the exhaust gases being released into the atmosphere. The fine water/air spray released by the venturi nozzle contains tiny air-entrained bubbles in a balance, which allow rapid heat transfer between the water droplets and the hot exhaust gases into which the water/air mixture is injected, thus cooling the exhaust gases. Accordingly, the system and method of the present invention can be used with any source of exhaust gases, regardless of the presence of particulate matter therein, to lower the temperature of the exhaust gases being released into the atmosphere. Additionally, the rapid cooling of the exhaust gas stream causes some of the gases, such as carbon dioxide and oxides of nitrogen, to adhere to the surfaces of the particulate matter and water droplets and become captured. The concentrations of these gases in the exhaust emissions is thus reduced. As will be appreciated by persons skilled in the art, various chemical additives can be added to the water supply for the venturi nozzle in order to assist in the capture of other specific gases and particulates that may be present, depending on the nature of the fuel and combustion.

Figure 4:
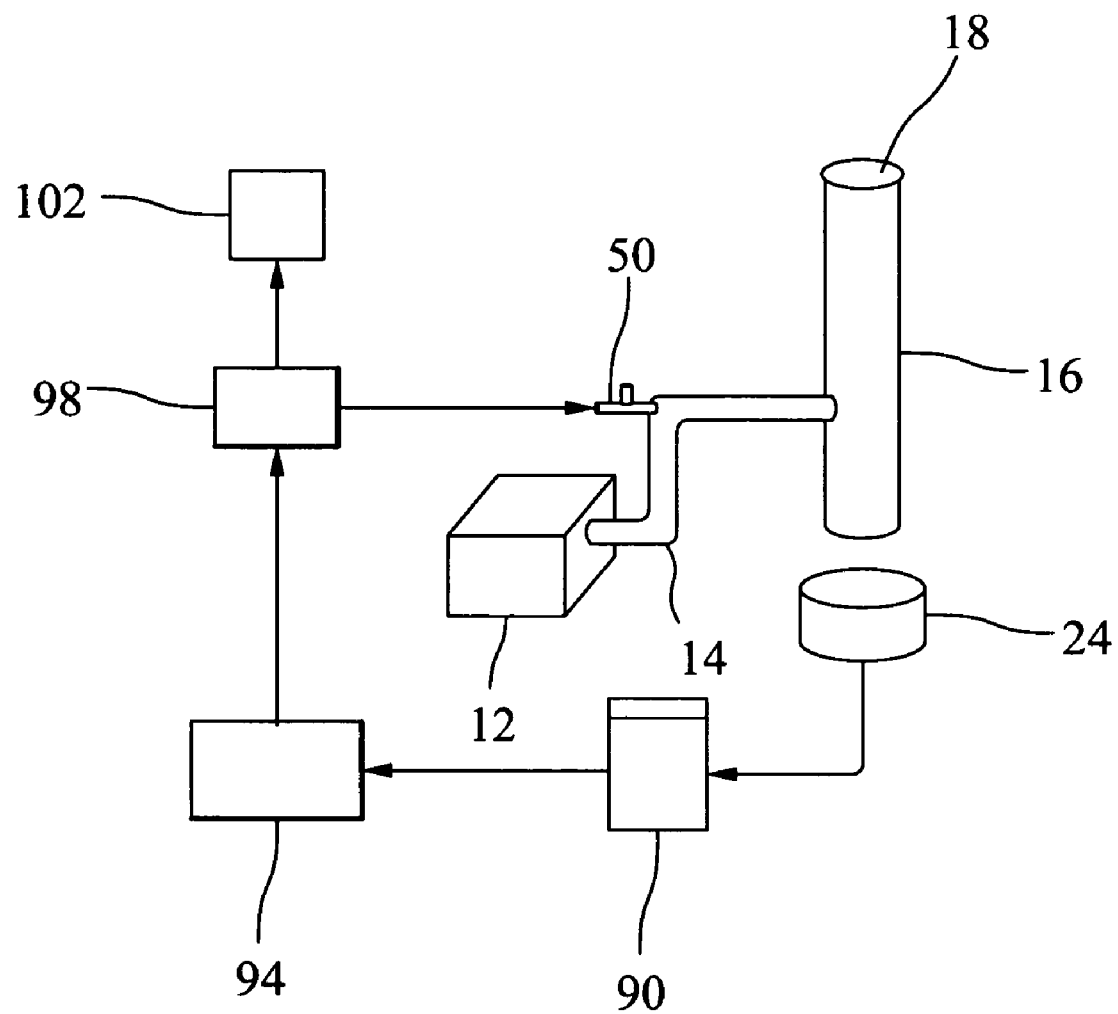
FIG. 4 shows a schematic diagram of a system for treating exhaust and filtering water, according to an exemplary embodiment of the present invention.

FIG. 4 shows a schematic diagram of a system for treating exhaust and collecting and filtering the water containing the particulate matter removed from the exhaust, as discussed with respect to the exemplary embodiment depicted in FIGS. 1 through 3. Exhaust from the exhaust source 12 passes through the duct 14, where water spray is injected by venturi nozzles 50 to capture particulates in the exhaust gases. The exhaust gases exit the exhaust opening 18 of the exhaust outlet 16 to atmosphere, and the water droplets, along with any particulates adhering to them, fall downward from the exhaust outlet, where the water can be collected in a receptacle 24. The collected water can be run through a filter 90 to remove the particulate matter collected from the exhaust.

The filter 90 can be a ceramic filter using particles fabricated from refined porcelaneous clays, dry clays, sawdust, or other suitable material known to persons skilled in the art. In an exemplary embodiment, the filter medium is made from a mixture of 50% dry clay and 50% sawdust, screened between a 35 mesh and a 60 mesh screen The material that passes through the 35 mesh screen but does not pass through the 60 mesh screen is used for the filter medium and the material can then be soaked in a 32% colloidal silver solution. The filter medium can be contained in a clay or plastic container. This ceramic filter can have the advantage of cooling and condensing the steam as it passes through the filter, such that the water exits the filter in liquid form. Alternatively, the filter 90 can be implemented in other ways known to persons skilled in the art.

The filter 90 can be formed integrally with the receptacle 24 or the filter 90 can be contained in a separate unit. After filtering, the water can be passed through a heat transfer device or radiator 94, which removes heat and lowers the water's temperature. From there, the water can be returned to a pump 98, which can re-supply the water to the venturi nozzle 50 in the exhaust duct 14. The pump 98 can also draw upon an external source of water to replenish water that is lost to evaporation or otherwise exits the system. Additionally, the pump 98 can supply a portion of the water to other uses 102.

Following from the above description and invention summaries, it should be apparent to persons of ordinary skill in the art that, while the methods and apparatuses herein described constitute exemplary embodiments of the present invention, it is to be understood that the inventions contained herein are not limited to the above precise embodiments and that changes may be made without departing from the scope of the invention as defined by the following proposed points of novelty. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. An exhaust treatment system comprising:
   an exhaust duct including an upstream end adapted to receive exhaust gases from a source and a downstream end;
   an exhaust outlet joined to the downstream end of the exhaust duct in fluid communication with the exhaust duct, adapted to flow exhaust gases out from the exhaust duct and adapted to flow water and particulate matter out from the exhaust duct; and
   at least one venturi nozzle joined to the exhaust duct between the upstream end and the downstream end, the venturi nozzle being arranged to inject a water/air mixture into the exhaust duct, the venturi nozzle having:
   (a) a nozzle housing having a water inlet and a water/air mixture outlet, the water/air mixture outlet being fluidicly connected to the exhaust duct;
   (b) a narrowing inlet channel, provided within the nozzle housing, having a channel inlet approximate the nozzle water inlet and a channel outlet within the nozzle housing;
   (c) an air inlet, provided on the nozzle housing and opening onto the channel outlet within the nozzle housing, through which air can enter; and
   (d) an internal baffle positioned within the nozzle housing downstream of the channel outlet around which water flowing through the channel outlet can pass;
   whereby water entering the venturi nozzle via the water inlet increases in velocity within the narrowing inlet channel, is mixed with air from the air inlet as it exits the channel, and such water/air mixture is injected into the exhaust duct via the water/air mixture outlet;

wherein the water/air mixture causes particulate matter suspended in the exhaust gases to adhere to water droplets in the water/air mixture.

2. The exhaust treatment system of claim 1, wherein at least one of carbon dioxide or oxides of nitrogen is present in the exhaust gases and adheres to the water droplets in the mixture.

3. The exhaust treatment system of claim 1, further comprising:
a receptacle positioned in proximity to the exhaust outlet and adapted for collecting water and particulate matter exiting the exhaust outlet.

4. The exhaust treatment system of claim 3, further comprising:
a filter adapted to receive water from the receptacle and remove particulate matter from the water.

5. The exhaust treatment system of claim 4, further comprising:
a heat transfer device adapted to receive water from the filter and remove heat from the water.

6. A method for exhaust treatment comprising the steps of:
(a) receiving exhaust gases using an exhaust duct fluidicly interposing a source and an exhaust outlet;
(b) mixing water and air using a venturi nozzle to form a water/air mixture, a the venturi nozzle including:
 (1) a nozzle housing having a water inlet and a water/air mixture outlet, the water/air mixture outlet being fluidicly connected to the exhaust duct;
 (2) a narrowing inlet channel, provided within the nozzle housing, having a channel inlet approximate the water inlet and a channel outlet within the nozzle housing;
 (3) an air inlet, provided on the nozzle housing and opening onto the channel outlet within the nozzle housing, through which air can enter; and
 (4) an internal baffle positioned within the nozzle housing downstream of the channel outlet around which water flowing through the channel outlet can pass;
whereby water entering the venturi nozzle via the water inlet increases in velocity within the narrowing inlet channel and is mixed with air from the air inlet as it exits the channel;
(c) injecting the water/air mixture into the exhaust gasses in the exhaust duct between the source and the exhaust outlet via the water/air mixture outlet, wherein the mixture causes particulate matter suspended in the exhaust gases to adhere to water droplets in the mixture;
(d) collecting the water droplets.

7. The method of claim 6, wherein at least one of carbon dioxide or oxides of nitrogen is present in the exhaust gases and adheres to the water droplets in the mixture of water droplets and exhaust gases.

8. The method of claim 6, further comprising the step of:
(d) filtering the collected water.

9. The method of claim 8, further comprising the step of:
(e) cooling the collected water.

10. The method of claim 9, further comprising the step of:
recirculating the cooled water from step (e) by mixing the water as a spray of water droplets with the exhaust gases.

11. The exhaust treatment system of claim 5, further comprising:
a pump adapted to receive water from the heat transfer device or an external water source;
wherein the pump is further adapted to transfer said water to the at least one venturi nozzle.

12. The exhaust treatment system of claim 4, wherein the filter is integrally coupled to the receptacle.

13. The exhaust treatment system of claim 4, wherein the filter is contained in an apparatus separate from the receptacle.

14. The exhaust treatment system of claim 5, wherein the heat transfer device is a radiator.

* * * * *